United States Patent [19]
Stadnick et al.

[11] Patent Number: 6,146,786
[45] Date of Patent: Nov. 14, 2000

[54] ELECTROCHEMICAL STORAGE CELL HAVING A CENTRAL CORE PROVIDING MECHANICAL, THERMAL, AND ELECTRICAL FUNCTIONS

[75] Inventors: Steven J. Stadnick, Lakewood; Walter R. Oswald, Huntington Beach, both of Calif.

[73] Assignee: Hughes Electronics Corporation, El Segundo, Calif.

[21] Appl. No.: 09/119,091

[22] Filed: Jul. 20, 1998

[51] Int. Cl.[7] ...................................................... H01M 4/36
[52] U.S. Cl. .......................... 429/101; 429/223; 429/120; 429/160
[58] Field of Search .................................. 429/223, 218.2, 429/120, 152, 160, 149, 101

[56] References Cited

U.S. PATENT DOCUMENTS

| | | |
|---|---|---|
| 3,669,744 | 6/1972 | Tsenter et al. . |
| 4,000,350 | 12/1976 | Wittmann . |
| 4,115,630 | 9/1978 | Van Ommering et al. ................ 429/72 |
| 4,250,235 | 2/1981 | DuPont et al. . |
| 4,262,061 | 4/1981 | Rogers . |
| 4,283,844 | 8/1981 | Milden et al. . |
| 4,324,845 | 4/1982 | Stockel ..................................... 429/101 |
| 4,369,212 | 1/1983 | Rogers et al. . |
| 4,683,178 | 7/1987 | Stadnick et al. . |
| 5,168,017 | 12/1992 | Jones et al. .............................. 429/101 |

*Primary Examiner*—Stephen Kalafut
*Assistant Examiner*—Monique Wills
*Attorney, Agent, or Firm*—T. Gudmestad; M. Sales

[57] ABSTRACT

An energy storage cell includes a vessel having a wall with a pair of oppositely disposed apertures therethrough, and an electrochemical cell, such as a nickel-hydrogen cell, within the vessel interior. A central core extends through the oppositely disposed apertures and performs all basic electrical, compressive support, and thermal removal functions for the energy storage cell. The central core includes electrical interconnects for the plate sets of the electrochemical cell, axial compression loading supports for the plate sets, and a heat pipe or other structure for removing heat from the interior of the vessel.

20 Claims, 2 Drawing Sheets

ELECTROCHEMICAL STORAGE CELL HAVING A CENTRAL CORE PROVIDING MECHANICAL, THERMAL, AND ELECTRICAL FUNCTIONS

BACKGROUND OF THE INVENTION

This invention relates to electrochemical storage cells such as a nickel-hydrogen storage cell, and, more particularly, to the support structure for the cell.

Rechargeable cells or batteries are electrochemical energy storage devices for storing and retaining an electrical charge and later delivering that charge as useful power. Familiar examples of the rechargeable energy storage cell are the lead-acid cell used in automobiles, and the nickel-cadmium cell used in various portable electronic devices. Another type of energy storage cell having a greater storage capacity for its weight is the nickel oxide/pressurized hydrogen energy storage cell, an important type of which is commonly called the nickel-hydrogen energy storage cell and is used in spacecraft applications. The weight of the spacecraft energy storage cell must be minimized while achieving the required performance level, due to the cost of lifting weight to earth orbit and beyond.

The nickel-hydrogen energy storage cell includes a series of active plate sets which store an electrical charge electrochemically and later deliver that charge as a useful current. The active plate sets are packaged within a hermetic pressure vessel that contains the plate sets and the hydrogen gas that is an essential active component of the energy storage cell. Each plate set includes a positive electrode, a negative electrode, and a separator between the two electrodes, all soaked with an electrolyte. In a typical energy storage cell, a number of plate sets are supported on a core under a compressive loading, with a gas screen between each plate set and with electrical connector leads extending to each electrode of each plate set. The gas screen provides a gas channel from the hydrogen electrode to the gas space outside the stack. A single nickel-hydrogen energy storage cell delivers current at about 1.3 volts, and a number of the energy storage cells are usually electrically interconnected in series to produce current at the voltage required by the systems of the spacecraft.

Electrical current is delivered from the exterior of the energy storage cell to the plate sets during charging, and delivered from the plate sets to the exterior of the energy storage cell during discharging. The electrical path is through individual leads extending to terminals in the cell wall, and thence to external electrical interconnects. Heat produced in the active plate sets during the electrochemical charging/discharging cycle is removed through the peripheries of the plate sets to the pressure vessel wall.

This approach is well proven and widely used in a variety of spacecraft applications. However, there is always a need to reduce the weight of the battery if possible, with improved performance or at least without loss of performance. The present invention fulfills this need, and further provides related advantages.

SUMMARY OF THE INVENTION

The present invention provides an electrochemical energy storage cell in which the weight is reduced over existing cells. Electrical, mechanical, and thermal efficiency of the storage cell are improved. Weight is reduced by combining the support, electrical, and thermal functions into a single structure. The electrochemical energy storage cell of the invention may be used in the same applications as conventional cells.

In accordance with the invention, an energy storage cell comprises a vessel having a wall with a pair of oppositely disposed apertures therethrough, and a vessel interior within the wall. Optionally, the outer surface of the vessel may be wrapped with an external circumferentially extending reinforcement to carry part of the pressure loading. There is an electrochemical cell, preferably a nickel-hydrogen storage cell, located within the vessel interior and comprising at least one plate set. Each plate set has a positive electrode and a negative electrode. A central core extends through the oppositely disposed apertures. The central core includes means for providing electrical contact to the positive and negative electrodes of each plate set, means for applying an axial compressive load acting through each of the plate sets, and means for removing heat from the electrochemical cell. A pair of pressure seals is provided, one pressure seal between the central core and the vessel wall at each of the oppositely disposed apertures.

In a preferred embodiment, the central core is formed as an electrically conductive first length, an electrically conductive second length, and an electrical insulator between the first length and the second length, with the electrical insulator lying within the vessel interior. A negative electrical interconnect extends between the negative electrode of the at least one plate set and the first length of the central core at a location within the vessel interior, and a negative terminal is in electrical communication with the first length of the central core at a location outside the vessel interior. A corresponding positive electrical interconnect extends between the positive electrode of the at least one plate set and the second length of the central core at a location within the vessel interior, and a positive terminal is in electrical communication with the second length of the central core at a location outside the vessel interior. A first compressive support is affixed to the central core at a first location, and a second compressive support is affixed to the central core at a second location. At least one of the compressive supports usually includes a Belleville washer selected to maintain a compressive force acting through the at least one plate set. The at least one plate set is captured between the first compressive support and the second compressive support and is loaded in compression between the first compressive support and the second compressive support. The central core is preferably provided with an accelerated heat conduction structure such as a heat pipe.

In most cases, the energy storage cell further includes means for supporting the central core from an external structure, located external to the vessel. The means for supporting includes an electrical insulator between the central core and the external structure, to isolate the electrically conductive central core.

The central core approach of the invention provides for the mechanical support of the plate sets of the electrochemical cell, as well as for heat conduction from the electrochemical cell to an external heat sink. Electrical interconnection is made through the central core. Thus, the electrical, thermal, and electrical functions are supplied by a single hardware element, rather than through multiple hardware elements as in conventional pressurized cells of this type. The weight of the cell is substantially reduced, by as much as about 10 percent in one design, or about 60 pounds for a 10 kilowatt spacecraft.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
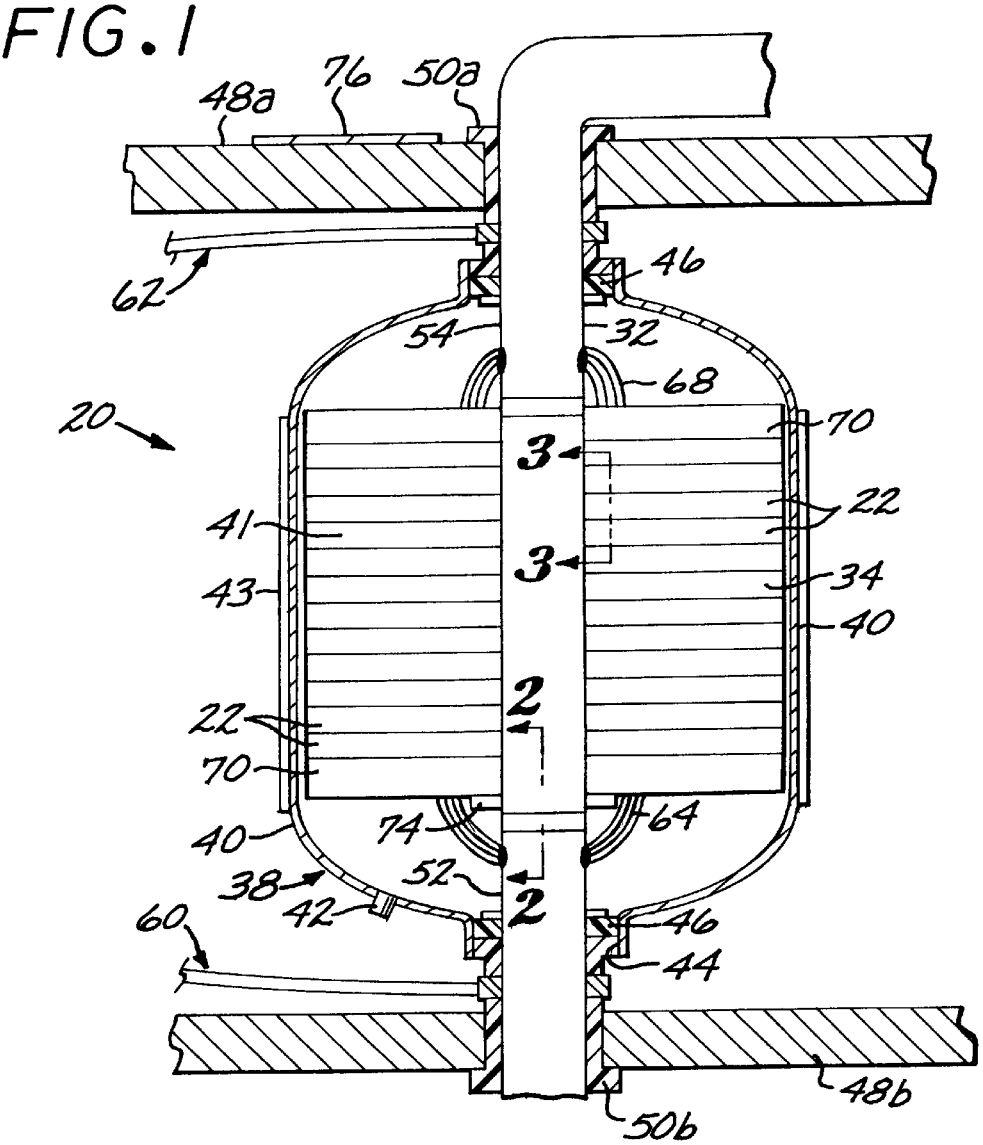
FIG. 1 is a sectional elevational view of a nickel-hydrogen energy storage cell.
Figure 2:
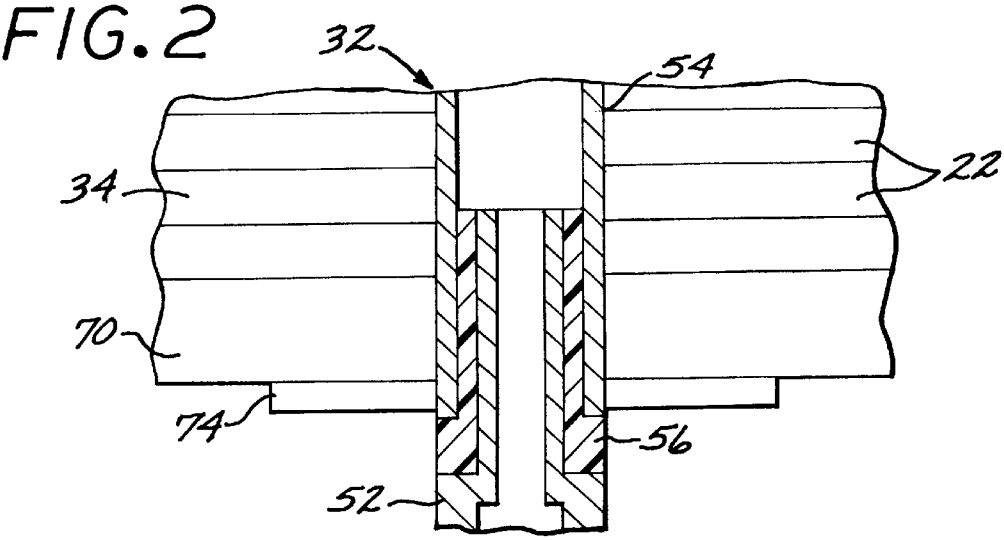
FIG. 2 is an enlarged detail of FIG. 1, taken in region 2—2.
Figure 3:
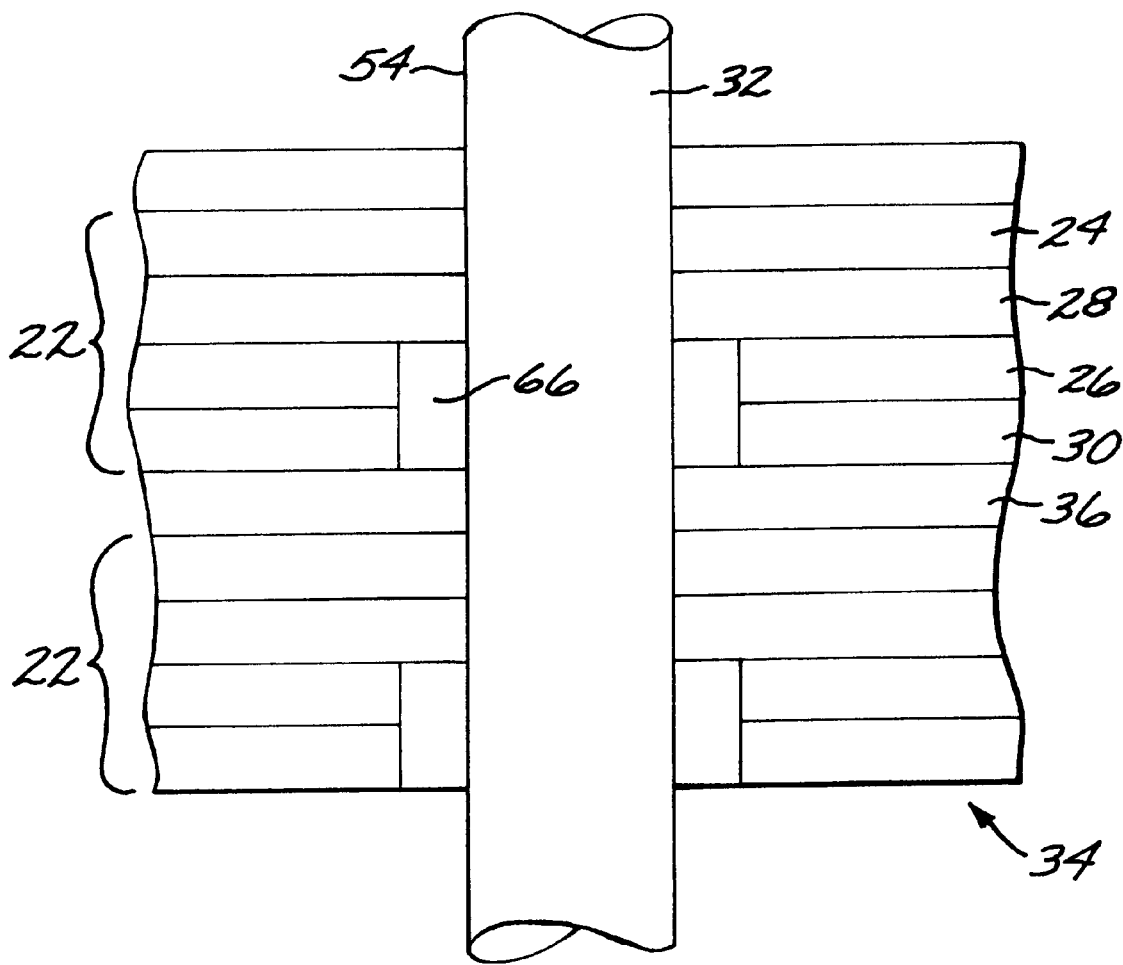
FIG. 3 is an enlarged detail of FIG. 1, taken generally on line 3—3 and illustrating the plate sets.

The present invention is preferably used in conjunction with a nickel-hydrogen energy storage cell 20, as illustrated in FIGS. 1–3, of the pressurized gas-metal cell type. Various prior constructions of nickel-hydrogen cells and components are disclosed in the following U.S. Patents: U.S. Pat. Nos. 4,683,178; 4,369,212; 4,283,844; 4,262,061; 4,250,235; 4,000,350; and 3,669,744.

The storage cell 20 of the present invention typically comprises at least one, and preferably a plurality of individual plate sets 22, shown in detail in FIG. 3. Each plate set 22 in turn comprises an anode or positive electrode 24, a cathode or negative electrode 26, and an electrolyte-containing separator 28, which physically separates the electrodes 24 and 26 and also supplies the electrolyte medium through which ionic and electronic charge transfer.

The positive electrode 24 is typically formed by impregnating nickel hydroxide into porous sintered nickel that is supported on an etched nickel electrode substrate. The negative electrode 26 is coated on one side by a sintered mixture of platinum black and polytetrafluoroethylene and on the other side with a porous layer 30 of polytetrafluoroethylene. These layers are applied to a nickel substrate in the form of etched sheet or a woven mesh, to form the negative electrode 26. Many different types of separators 28 have been used, including, for example, asbestos, nylon, and a cloth of zirconium oxide-yttrium oxide. The electrolyte, preferably an aqueous solution containing about 26–31 percent by weight concentration of potassium hydroxide, is impregnated into the separator 28, and thence reaches the electrodes 24 and 26.

The individual plate sets 22 are assembled onto a central core 32 to form a stacked array 34. A monofilament polypropylene screen 36 is positioned between each plate set 22 during assembly, so that hydrogen generated during charge and consumed during discharge has a pathway to the negative electrode 26, and so that oxygen liberated during overcharging at each positive electrode 24 can diffuse away from the electrode 24 and to the negative electrode 26 to combine with hydrogen.

The stacked array 34 is contained within a hermetically sealed pressure vessel 38 having a wall 40 and an interior 41. The wall 40 is manufactured of a material such as Inconel 718 nickel-base alloy which can withstand internal pressures on the order of 1,000 psia, without damage by hydrogen embrittlement. The exterior surface of the wall 40 may be wrapped with one or more layers 43 of a composite material such as a cured graphite/epoxy composite material to aid in withstanding the internal pressure generated during service. By using the external reinforcement, the weight of the metal in the wall 40 of the pressure vessel 38 may be reduced. The internal pressure within the pressure vessel 38 may optionally be monitored by any operable technique, such as a pressure gauge or a strain gage on the outer surface of the wall 40 to measure deflection of the wall during service, which is a function of the internal pressure.

The material of construction of the wall 40 has a relatively low diffusion coefficient of hydrogen therethrough, so that hydrogen is contained within the interior of the pressure vessel 38. A gas fill tube 42 allows gas content and pressure within the pressure vessel 38 to be controlled initially. The gas fill tube 42 is sealed after the initial charging procedures are complete.

The pressure vessel 38 is typically constructed in the form of a cylindrical tube having domed ends. By way of illustration, the cell 20 having the pressure vessel 38 of external dimensions of 3½ to 5½ inches in diameter by 13–15 inches long contains about 40–100 individual plate sets 22, with a resulting electrical storage capacity of the cell of about 50 to about 350 ampere-hours. The cell 20 may be charged and discharged through thousands of cycles without apparent damage, if the charging and discharging are accomplished properly. A number of cells 20 are ordinarily combined in series or parallel arrangements as a battery.

In the present approach, the pressure vessel 38 has a pair of oppositely disposed apertures 44, one through each of the domed ends of the pressure vessel 38. The central core 32 extends through the apertures 44 and is sealed to the wall 40 at the apertures 44 by conventional hydraulic pressure seals 46. The pressure seals 46 are electrically nonconducting to electrically isolate the central core 32 from the wall 40 of the pressure vessel 38.

Outside of the pressure vessel 38, the central core 32, and thence the cell 20, is supported on spacecraft structure 48a and 48b. Electrical insulators 50a and 50b are positioned between the central core 32 and the structure 48a and 48b, respectively, to electrically isolate the central core 32 from the spacecraft structure.

The central core 32 forms part of the electrical interconnection to the electrodes 24 and 26. As seen in FIG. 1 and in greater detail in FIG. 2, the central core 32 is divided into a first length 52 and a second length 54, separated by an electrical insulator 56. The electrical insulator 56 is located inside the pressure vessel 38, so that at least a portion of the first length 52 is inside the pressure vessel 38, and a portion of the second length 54 is inside the pressure vessel 38. The insulator 56 bears an axial load, and is preferably made of a ceramic material such as aluminum oxide to which the first length 52 and the second length 54 of the central core 32 are brazed. As shown in FIG. 2, in a preferred approach the first length 52 is formed with an end 58 of reduced diameter. The insulator 56 is formed as a collar with a flange at one end to prevent contact between the first length 52 and the second length 54. The insulator 56 is placed over the end 58, and the second length 54 is placed over the insulator 56. The assembly is then brazed.

An electrical terminal, here depicted as a negative terminal 60, is connected by any operable approach, such as by compression in a threaded connection or by welding, to the first length 52 at a location outside of the pressure vessel 38. Another electrical terminal, here depicted as a positive terminal 62, is connected by any operable approach, such as by compression in a threaded connection or by welding, to the second length 54 at a location outside of the pressure vessel 38. The central core 32 is made of an electrically conductive material such as high-purity nickel. (Alternatively, the central core 32 could be made of another material, and coated on its internal surface with copper.) The first length 52 of the central core 32 therefore serves as the electrical feedthrough for one leg of the electrical connection to the plate sets 22, and the second length 54 serves as the electrical feedthrough for the other leg of the electrical connection. No separate feedthrough is required, reducing weight and increasing the reliability of the system, the latter being an important consideration for the battery cell 20 that may be expected to function reliably for 15 years or more in geosynchronous orbit.

The central core 32 also mechanically supports the plate sets 22. As seen in FIG. 3, the electrodes 24 and 26, the separator 28, and the screen 36 all have an annular form with an inner diameter that fits over the outer diameter of the central core 32.

The electrical connection from the first length 52 to the negative electrodes 26, and from the second length 54 to the positive electrodes 24, may be made in any operable manner, and two preferred approaches are illustrated. In both approaches, negative interconnect wires 64 are connected at one end by any operable approach, such as welding, to the first length 52, and are connected at the other end by any operable approach, such as welding, to the negative electrodes 26. In this illustrated embodiment, the negative electrodes 26 are supported from the second length 54 of the central core 32, but are electrically isolated from the second length 54 by fiber washer insulators 66. In one of the approaches, illustrated in FIG. 1, a similar technique is used for positive interconnect wires 68. That is, one end of the positive interconnect wires 64 is connected to the second length 54, and the other end is connected to the positive electrodes 24. In the other approach, illustrated in FIG. 3, the positive electrodes 24 are mounted with an interference fit directly to the central core 32, which provides the conduction path to the positive electrodes 24 without the need for any positive interconnect wires.

A compressive load is applied through the plate stacked array 34 by reaction of the load through the central core 32. As seen in FIG. 2, on one side of the stacked array 34, an end plate 70 is supported from the central core 32. The end plate 70 faces against the last of the plate sets 22. A Belleville washer set 74 is positioned with the end plate 70 between the Belleville washer set 74 and the stacked array 34. A similar end plate 74, without a Belleville washer set, is provided at the other end of the plate stacked array 34, and supported on the central core 32. The Belleville washer set 74 places the stacked array 34 under a longitudinal pressure of, for example, about 10 pounds per square inch.

The central core 32 is configured to conduct heat from the interior 41 of the pressure vessel 38 to its exterior, such as to a radiator 76 that is part of the spacecraft structure 48. To accomplish the heat conduction efficiently, the central core 32 is preferably made of a nickel or stainless steel. This material serves both electrical and thermal conduction needs.

Optionally but preferably, the central core 32 may be hollow, and may serve as a gas/liquid-filled heat pipe. In this embodiment, the central core 32 contains a working fluid such as ammonia. Heat generated in the plate sets 22 vaporizes the working fluid, which is transferred by convection to a cool end, such as the end adjacent to the radiator 76. Heat is removed, and the working fluid condenses. It is transferred back to the hot area by a wicking action along a wick extending along the length of the interior of the central core. The heat transfer by such a heat pipe may be many times that of the best solid conductors.

Thus, the central core serves mechanical, electrical, and thermal functions in the approach of the invention. The central core supports the stacked array of plate sets and applies the compressive loading through them. The central core provides part of the electrically conductive path to the positive and negative electrodes of the plate sets. The central core transfers heat from the plate sets to an external heat sink, which heat transfer is particularly efficient if the central core is configured as a heat pipe.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An energy storage cell, comprising:

a vessel having a wall with a pair of oppositely disposed apertures therethrough, and a vessel interior within the wall;

an electrochemical cell within the vessel interior, the electrochemical cell comprising at least one plate set, each plate set comprising a positive electrode and a negative electrode;

a thermally conductive central core extending through the oppositely disposed apertures, the central core including an electrically conductive first length, an electrically conductive second length joined to but insulated from the first length, and an electrical insulator between the first length and the second length, the electrical insulator lying within the vessel interior;

a pair of pressure seals, one pressure seal between the central core and the vessel wall at each of the oppositely disposed apertures;

a negative electrical interconnect extending between the negative electrode of the at least one plate set and the first length of the central core at a location within the vessel interior;

a negative terminal in electrical communication with the first length of the central core at a location outside the vessel interior;

a positive electrical interconnect extending between the positive electrode of the at least one plate set and the second length of the central core at a location within the vessel interior;

a positive terminal in electrical communication with the second length of the central core at a location outside the vessel interior;

a first compressive support affixed to the central core at a first location; and a second compressive support affixed to the central core at a second location, with the at least one plate set being captured between the first compressive support and the second compressive support and loaded in compression between the first compressive support and the second compressive support.

2. The energy storage cell of claim 1, wherein the central core further comprises:

a heat pipe within an interior of the central core.

3. The energy storage cell of claim 1, wherein the electrochemical cell comprises a nickel-hydrogen storage cell.

4. The energy storage cell of claim 1, further comprising:

an external circumferentially extending reinforcement in contact with an outer surface of the vessel.

5. The energy storage cell of claim 1, further including means for supporting the central core from an external structure, the means for supporting being located external to the vessel.

6. The energy storage cell of claim 5, wherein the means for supporting includes an electrical insulator between the central core and the external structure.

7. The energy storage cell of claim 1, wherein at least one of the first compressive support and the second compressive support comprises a Belleville washer selected to maintain a compressive force acting through at least one plate set.

8. An energy storage cell, comprising:

a vessel having a wall with a pair of oppositely disposed apertures therethrough, and a vessel interior within the wall;

an electrochemical cell within the vessel interior, the electrochemical cell comprising at least one plate set, each plate set comprising a positive electrode and a negative electrode;

a central core extending through the oppositely disposed apertures, the central core comprising an electrically conductive first length, an electrically conductive second length, and an insulator disposed between and joining the first length and the second length, the central core including means for providing electrical contact of the first length to the positive electrodes of each plate set and for providing electrical contact of the second length to the negative electrodes of each plate set, means for applying an axial compressive load acting through each of the plate sets, and means for removing heat from the electrochemical cell; and a pair of pressure seals, one pressure seal between the central core and the vessel wall at each of the oppositely disposed apertures.

9. The energy storage cell of claim 8, wherein the means for providing electrical contact includes the central core having an electrically conductive first length, an electrically conductive second length, and an electrical insulator between the first length and the second length, the electrical insulator lying within the vessel interior;

a negative electrical interconnect extending between the negative electrode of the at least one plate set and the first length of the central core at a location within the vessel interior;

a negative terminal in electrical communication with the first length of the central core at a location outside the vessel interior;

a positive electrical interconnect extending between the positive electrode of the at least one plate set and the second length of the central core at a location within the vessel interior; and a positive terminal in electrical communication with the second length of the central core at a location outside the vessel interior.

10. The energy storage cell of claim 8, wherein the means for applying an axial compressive load comprises a first compressive support affixed to the central core at a first location; and a second compressive support affixed to the central core at a second location, with the at least one plate set being captured between the first compressive support and the second compressive support and loaded in compression between the first compressive support and the second compressive support.

11. The energy storage cell of claim 10, wherein at least one of the first compressive support and the second compressive support comprises a Belleville washer selected to maintain a compressive force acting through at least one plate set.

12. The energy storage cell of claim 8, wherein the means for removing heat comprises:

a heat pipe within an interior of the central core.

13. The energy storage cell of claim 8, wherein the electrochemical cell comprises a nickel-hydrogen storage cell.

14. The energy storage cell of claim 8, further including means for supporting the central core from an external structure, the means for supporting being located external to the vessel.

15. The energy storage cell of claim 14, wherein the means for supporting includes an electrical insulator between the central core and the external structure.

16. An energy storage cell, comprising:

a pressure vessel having a wall with a pair of oppositely disposed apertures therethrough, and a pressure vessel interior within the wall;

a nickel-hydrogen electrochemical cell within the pressure vessel interior, the electrochemical cell comprising a plurality of plate sets in facing relationship to each other, each plate set comprising a positive electrode and a negative electrode;

a thermally conductive central core extending through the oppositely disposed apertures, the central core including an electrically conductive first length, an electrically conductive second length joined to but insulated from the first length, and an electrical insulator between the first length and the second length, the electrical insulator lying within the vessel interior;

a heat pipe within an interior of the central core;

a pair of pressure seals, one pressure seal between the central core and the vessel wall at each of the oppositely disposed apertures;

a negative electrical interconnect extending between the negative electrode of each plate set and the first length of the central core at a location within the vessel interior;

a negative terminal in electrical communication with the first length of the central core at a location outside the vessel interior;

a positive electrical interconnect extending between the positive electrode of each plate set and the second length of the central core at a location within the vessel interior;

a positive terminal in electrical communication with the second length of the central core at a location outside the vessel interior;

a first compressive support affixed to the central core at a first location; and a second compressive support affixed to the central core at a second location, with the plurality of plate sets being captured between the first compressive support and the second compressive support and loaded in compression between the first compressive support and the second compressive support.

17. The energy storage cell of claim 1, wherein the positive electrical interconnect comprises a direct contact between the positive electrode of each plate set and the second length of the central core, and the negative electrical interconnect comprises a wire extending between the negative electrode of each plate set and the first length of the central core.

18. The energy storage cell of claim 1, wherein
the negative electrical interconnect comprises a direct contact between the negative electrode of each plate set and the first length of the central core, and
the positive electrical interconnect comprises a wire extending between the positive electrode of each plate set and the second length of the central core.

19. The energy storage cell of claim 16, wherein
the positive electrical interconnect comprises a direct contact between the positive electrode of each plate set and the second length of the central core, and
the negative electrical interconnect comprises a wire extending between the negative electrode of each plate set and the first length of the central core.

20. The energy storage cell of claim 16, wherein
the negative electrical interconnect comprises a direct contact between the negative electrode of each plate set and the first length of the central core, and
the positive electrical interconnect comprises a wire extending between the positive electrode of each plate set and the second length of the central core.

* * * * *